(12) United States Patent
Tan et al.

(10) Patent No.: US 11,907,090 B2
(45) Date of Patent: Feb. 20, 2024

(54) MACHINE LEARNING FOR TAPS TO ACCELERATE TDECQ AND OTHER MEASUREMENTS

(71) Applicant: Tektronix, Inc., Beaverton, OR (US)

(72) Inventors: Kan Tan, Portland, OR (US); John J. Pickerd, Hillsboro, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 17/876,817

(22) Filed: Jul. 29, 2022

(65) Prior Publication Data

US 2023/0050162 A1    Feb. 16, 2023

Related U.S. Application Data

(60) Provisional application No. 63/232,580, filed on Aug. 12, 2021.

(51) Int. Cl.
*G06F 11/273* (2006.01)
*G06F 11/267* (2006.01)

(52) U.S. Cl.
CPC ........ *G06F 11/2733* (2013.01); *G06F 11/267* (2013.01)

(58) Field of Classification Search
CPC ........................... G06F 11/2733; G06F 11/267
See application file for complete search history.

(56) References Cited

U.S. PATENT DOCUMENTS 5,272,723 A   12/1993 Kimoto
5,397,981 A    3/1995 Wiggers
(Continued)

FOREIGN PATENT DOCUMENTS

CN    107342810    11/2019
EP      2743710     9/2018
(Continued)

OTHER PUBLICATIONS

Watts et al., "Performance of Single-Mode Fiber Links Using Electronic Feed-Forward and Decision Feedback Equalizers", 2005, IEEE Photonics Techology Letters, vol. 17, No. 10, pp. 2206-2208 (Year: 2005).*

(Continued)

*Primary Examiner* — Matthew M Kim
*Assistant Examiner* — Indranil Chowdhury
(74) *Attorney, Agent, or Firm* — Miller Nash LLP; Andrew J. Harrington

(57) ABSTRACT

A test and measurement instrument has an input configured to receive a signal from a device under test, a memory, a user interface to allow the user to input settings for the test and measurement instrument, and one or more processors, the one or more processors configured to execute code that causes the one or more processors to: acquire a waveform representing the signal received from the device under test; generate one or more tensor arrays based on the waveform; apply machine learning to the one or more tensor arrays to produce equalizer tap values; and apply equalization to the waveform using the equalizer tap values to produce an equalized waveform; and perform a measurement on the equalized waveform to produce a value related to a performance requirement for the device under test. A method of testing a device under test includes acquiring a waveform representing a signal received from the device under test, generating one or more tensor arrays based on the waveform, applying machine learning to the one or more tensor arrays to produce equalizer tap values, applying the equalizer taps values to the waveform to produce an equalized waveform, performing a measurement on the equalized waveform to produce a value related to a performance requirement for the device under test.

20 Claims, 8 Drawing Sheets

(56) References Cited

U.S. PATENT DOCUMENTS

| | | | |
|---|---|---|---|
| 5,594,655 A | 1/1997 | Berchin | |
| 7,181,146 B1 | 2/2007 | Yorks | |
| 7,298,463 B2 | 11/2007 | French | |
| 8,583,395 B2 | 11/2013 | Dybsetter | |
| 8,861,578 B1 | 10/2014 | Lusted | |
| 9,059,803 B2 | 6/2015 | Detofsky | |
| 9,337,993 B1 | 5/2016 | Lugthart | |
| 9,548,858 B1 | 1/2017 | Cirit | |
| 9,699,009 B1 | 7/2017 | Ainspan | |
| 10,171,161 B1 | 1/2019 | Cote | |
| 10,236,982 B1 | 3/2019 | Zhuge | |
| 10,270,527 B1 | 4/2019 | Mentovich | |
| 10,396,897 B1 | 8/2019 | Malave | |
| 10,585,121 B2 | 3/2020 | Absher | |
| 10,727,973 B1 | 7/2020 | Kumar | |
| 10,852,323 B2 | 12/2020 | Schaefer | |
| 10,863,255 B2 | 12/2020 | Zhang | |
| 11,005,697 B2 | 5/2021 | Liston | |
| 11,040,169 B2 | 6/2021 | Jung | |
| 11,095,314 B2 | 8/2021 | Medard | |
| 11,177,986 B1 | 11/2021 | Ganesan | |
| 11,233,561 B1 | 1/2022 | O'Shea | |
| 11,237,190 B2 | 2/2022 | Rule | |
| 11,336,378 B2 | 5/2022 | Buttoni | |
| 11,388,081 B1 | 7/2022 | Sommers | |
| 11,476,967 B2 | 10/2022 | Geng | |
| 11,646,863 B2 * | 5/2023 | Balan | H04L 25/03878 375/354 |
| 11,695,601 B2 | 7/2023 | Sudhakaran | |
| 2002/0063553 A1 | 5/2002 | Jungerman | |
| 2003/0053170 A1 | 3/2003 | Levinson | |
| 2003/0220753 A1 | 11/2003 | Pickerd | |
| 2004/0032889 A1 | 2/2004 | Hikada | |
| 2004/0121733 A1 | 6/2004 | Peng | |
| 2004/0131365 A1 | 7/2004 | Lee | |
| 2004/0136422 A1 | 7/2004 | Mahowald | |
| 2004/0165622 A1 | 8/2004 | Lu | |
| 2004/0223544 A1 * | 11/2004 | Upton | H04L 25/03019 375/233 |
| 2004/0236527 A1 | 11/2004 | Felps | |
| 2005/0222789 A1 | 10/2005 | West | |
| 2005/0246601 A1 | 11/2005 | Waschura | |
| 2005/0249252 A1 | 11/2005 | Sanchez | |
| 2006/0120720 A1 | 6/2006 | Hauenschild | |
| 2021/0111794 A1 | 6/2006 | Huang | |
| 2008/0126001 A1 | 5/2008 | Murray | |
| 2008/0159737 A1 | 7/2008 | Noble | |
| 2008/0212979 A1 | 9/2008 | Ota | |
| 2009/0040335 A1 | 2/2009 | Ito | |
| 2011/0085793 A1 | 4/2011 | Oomori | |
| 2011/0161738 A1 | 6/2011 | Zhang | |
| 2011/0286506 A1 * | 11/2011 | Libby | G01R 35/005 375/224 |
| 2013/0046805 A1 | 2/2013 | Smith | |
| 2014/0093233 A1 | 4/2014 | Gao | |
| 2014/0343883 A1 * | 11/2014 | Libby | G01R 13/02 702/68 |
| 2015/0003505 A1 | 1/2015 | Lusted | |
| 2015/0055694 A1 | 2/2015 | Juenemann | |
| 2015/0207574 A1 | 7/2015 | Schoen | |
| 2016/0191168 A1 | 6/2016 | Huang | |
| 2016/0328501 A1 * | 11/2016 | Chase | G06F 30/367 |
| 2018/0006721 A1 | 1/2018 | Ishizaka | |
| 2018/0204117 A1 | 7/2018 | Brevdo | |
| 2019/0038387 A1 | 2/2019 | Chu | |
| 2019/0278500 A1 | 9/2019 | Lakshmi | |
| 2019/0332941 A1 | 10/2019 | Towal | |
| 2019/0370158 A1 | 12/2019 | Rivoir | |
| 2019/0370631 A1 | 12/2019 | Fais | |
| 2020/0035665 A1 | 1/2020 | Chuang | |
| 2020/0057824 A1 | 2/2020 | Yeh | |
| 2020/0166546 A1 | 5/2020 | O'Brien | |
| 2020/0195353 A1 | 6/2020 | Ye | |
| 2020/0229206 A1 | 7/2020 | Badic | |
| 2020/0313999 A1 | 10/2020 | Lee | |
| 2020/0335029 A1 | 10/2020 | Gao | |
| 2021/0041499 A1 | 2/2021 | Ghosal | |
| 2021/0105548 A1 | 4/2021 | Ye | |
| 2021/0160109 A1 | 5/2021 | Seol | |
| 2021/0167864 A1 | 6/2021 | Razzell | |
| 2021/0314081 A1 | 10/2021 | Shattil | |
| 2021/0389373 A1 | 12/2021 | Pickerd | |
| 2021/0390456 A1 | 12/2021 | Pickerd | |
| 2022/0070040 A1 | 3/2022 | Namgoong | |
| 2022/0076715 A1 | 3/2022 | Lee | |
| 2022/0121388 A1 | 4/2022 | Woo | |
| 2022/0182139 A1 | 6/2022 | Zhang | |
| 2022/0199126 A1 | 6/2022 | Lee | |
| 2022/0200712 A1 | 6/2022 | Lillie | |
| 2022/0215865 A1 | 7/2022 | Woo | |
| 2022/0236326 A1 | 7/2022 | Schaefer | |
| 2022/0239371 A1 | 7/2022 | Xu | |
| 2022/0247648 A1 | 8/2022 | Pickerd | |
| 2022/0311513 A1 * | 9/2022 | Pickerd | H04B 10/40 |
| 2022/0311514 A1 | 9/2022 | Smith | |
| 2022/0334180 A1 | 10/2022 | Pickerd | |
| 2022/0373597 A1 | 11/2022 | Agoston | |
| 2022/0373598 A1 * | 11/2022 | Tan | G01R 31/31935 |
| 2022/0385374 A1 | 12/2022 | Arikawa | |
| 2022/0390515 A1 | 12/2022 | Pickerd | |
| 2022/0407549 A1 * | 12/2022 | Varughese | H04B 10/0731 |
| 2023/0052588 A1 | 2/2023 | Sudhakaran | |
| 2023/0088409 A1 | 3/2023 | Parsons | |
| 2023/0098379 A1 | 3/2023 | Smith | |
| 2023/0239182 A1 * | 7/2023 | Ikeda | H04B 3/04 375/229 |
| 2023/0299862 A1 * | 9/2023 | O'Shea | G06N 3/08 370/252 |

FOREIGN PATENT DOCUMENTS

| | | | |
|---|---|---|---|
| EP | 3936877 A1 * | 1/2022 | G01R 31/31905 |
| JP | 6560793 | 8/2019 | |
| WO | 2021092156 | 5/2021 | |
| WO | 2022171645 | 8/2022 | |
| WO | 2022189613 | 9/2022 | |

OTHER PUBLICATIONS

Echeverri-Chacon et al., "Transmitter and Dispersion Eye Closure Quaternary (TDECQ) and Its Sensitivity to Impairments in PAM4 Waveforms", 2019, Journal of Lightwave Technology, vol. 37, No. 3, pp. 852-860 (Year: 2019).*

Varughese, Siddarth, et al., Accelerating Assessments of Optical Components Using Machine Learning: TDECQ as Demonstrated Example, Journal of Lightwave Technology, Jan. 1, 2021, pp. 64-72, vol. 39, No. 1, IEEE.

Varughese, Siddarth, et al., Accelerating TDECQ Assessments using Convolutional Neural Networks, OFC, Mar. 2020, 3 pages, The Optical Society (OSA).

Wang et al., "Intelligent Constellation Diagram Analyzer Using Convolutional Neural Network-Based Deep Learning," Optics Express, Jul. 24, 2017, vol. 25, No. 15.

* cited by examiner

MACHINE LEARNING FOR TAPS TO ACCELERATE TDECQ AND OTHER MEASUREMENTS

CROSS-REFERENCE TO RELATED APPLICATIONS

This disclosure claims benefit of U.S. Provisional Application No. 63/232,580, titled "MACHINE LEARNING FOR TAPS TO ACCELERATE TDECQ AND OTHER MEASUREMENTS," filed on Aug. 12, 2021, the disclosure of which is incorporated herein by reference in its entirety.

TECHNICAL FIELD

This disclosure relates to test and measurement systems, and more particularly to systems for component parameter optimization and performance measurements.

BACKGROUND

When the signal speed increases, transmitters and receivers typically use equalizers to improve the system performance. For example, the IEEE 100G/400G Ethernet standards defines the measurement with a 5-tap feed-forward equalizer (FFE). See, for example, "IEEE 802.3cd-2018". http://standards.ieee.org/develop/project/802.3cd.html, 2018; "IEEE 802.3bs-2017", http://standards.ieee.org/find-stds/standard/802.3bs-2017.html 2017.

Many standards have performance measurements that the devices under test must meet. Some standards require measurements made to meet the standard be performed on the equalized signals. For example, IEEE 802.3 standards for 100G/400G specify the transmitter and dispersion eye closure (TDECQ) measurement as key pass/fail criteria for 26GBaud and 53GBaud PAM4 optical signaling. See id. The TDECQ measurement involves a 5-tap FFE. Optimization of the FFE taps improves device performance and increases the likelihood that the device will meet the standard specification requirements.

Speeding up this process saves time and reduces costs. On some production lines where the devices under test (DUTs) number in the tens of thousands, it may take seconds to complete a test. Reducing that time to a second or less would increase production and reduce costs.

DESCRIPTION

Machine learning techniques can significantly improve the speed of complex measurements such as Transmitter and Dispersion Eye Closure Quaternary (TDECQ) measurements, for example. The measurement speed improvements translate to the improvement of production throughput, for example on a manufacturing line. For the high-speed signal testing, the eye diagram of the signal has been used by machine learning to get measurement results. The full or partial pattern waveform are also used for machine learning for measurement. U.S. patent application Ser. No. 17/747,954, "SHORT PATTERN WAVEFORM DATABASE BASED MACHINE LEARNING FOR MEASUREMENT," filed May 18, 2022 (referred to here as "Kan"), the contents of which are hereby incorporated by reference, describes an alternative technique of using a short pattern waveform database for machine learning for measurement. Based on the method described in Kan, the embodiments here describe a new method that uses the machine learning to speed up the most time consuming steps in measurements to reduce the overall measurement time.

One should note that the below discussion, for ease or understanding, focuses on 5-tap feed-forward equalizers (FFE), but the techniques described here apply to optimization of any number of equalizer, or filter, taps, for any type of equalizer. Similarly, while the performance measurement used in the below discussion comprises TDECQ measurement, any performance measurement made on equalized waveforms could benefit from application of the embodiments here. The term "equalized waveform" as used here means a waveform after application of an equalizer.

The embodiments here include a test and measurement instrument, such as an oscilloscope used in testing a device under test (DUT). One example discussed below involves a process for testing DUTs comprising optical transceivers or transmitters, with the understanding that the embodiments may apply to any DUT that generates a signal.

Figure 1:
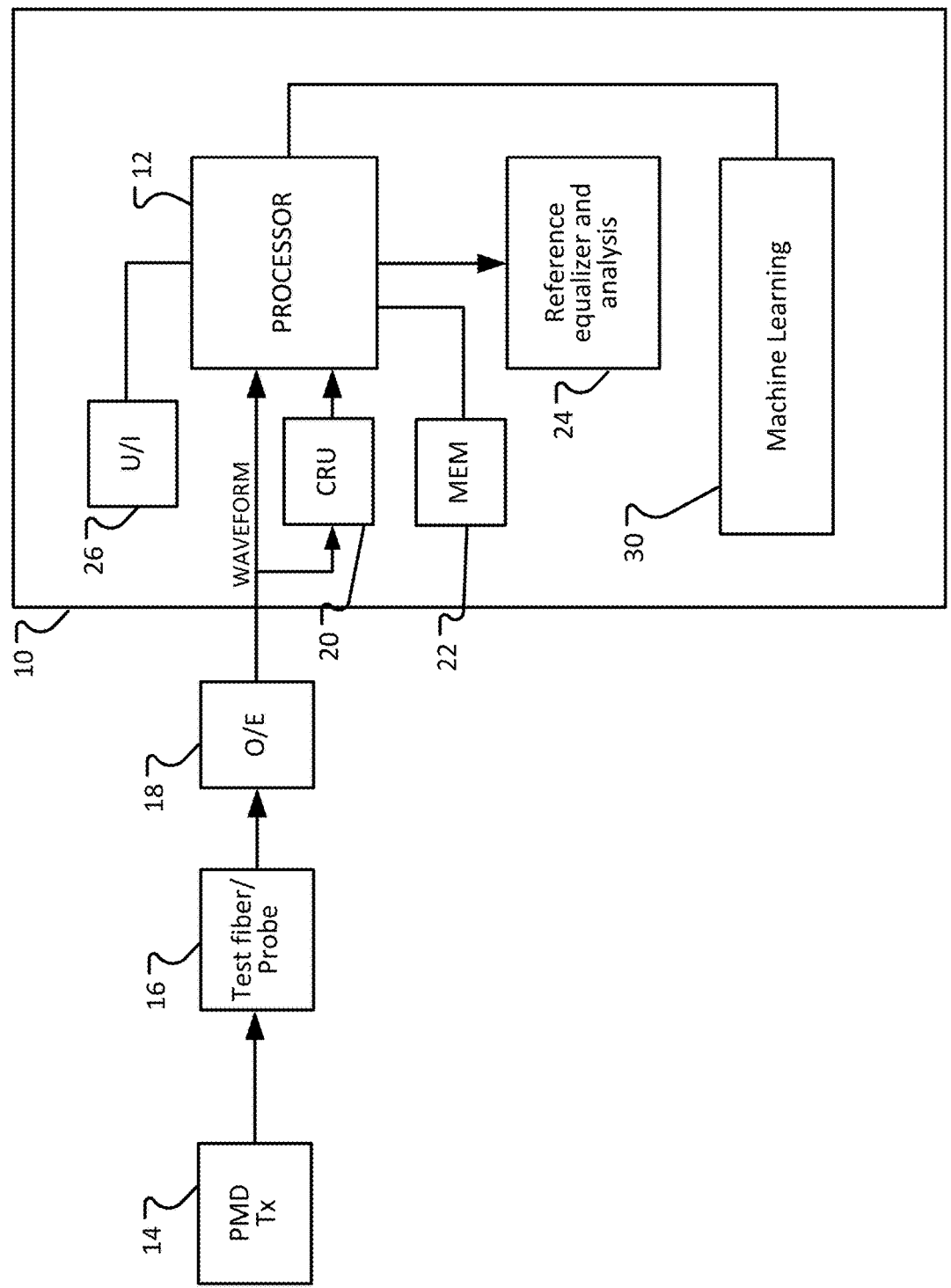
FIG. 1 shows an embodiment of a test and measurement instrument.

FIG. 1 shows an embodiment of a testing setup in the instance of an optical transmitter 14 as a DUT. The testing setup includes a test and measurement system that may include a test and measurement instrument such as an oscilloscope 10. The test and measurement instrument 10 receives, at an input, a signal from the DUT 14, typically through an instrument probe 16. In the case of an optical transmitter, the probe will typically comprise a test fiber coupled to an optical to electrical converter 18 that provides a signal to the test and measurement instrument. The signal is sampled and digitized by the instrument to become an acquired waveform. A clock recovery unit (CRU) 20 may recover the clock signal from the data signal, if the test and measurement instrument 10 comprises a sampling oscilloscope for example. The test and measurement instrument has one or more processors represented by processor 12, a memory 22 and a user interface 26. The memory may store executable instructions in the form of code that, when executed by the processor, causes the processor to perform tasks. The memory may also store one or more acquired waveforms. The user interface 26 of the test and measurement instrument allows a user to interact with the instrument 10, such as to input settings, configure tests, etc. The test and measurement instrument may also include a reference equalizer and analysis module 24.

The embodiments here employ machine learning in the form of a machine learning network 30, such a deep learning network. The machine learning network may include a processor that has been programmed with the machine learning network as either part of the test and measurement instrument, or to which the test and measurement instrument has access. As test equipment capabilities and processors evolve, the processor 12 may include both.

Figure 2:
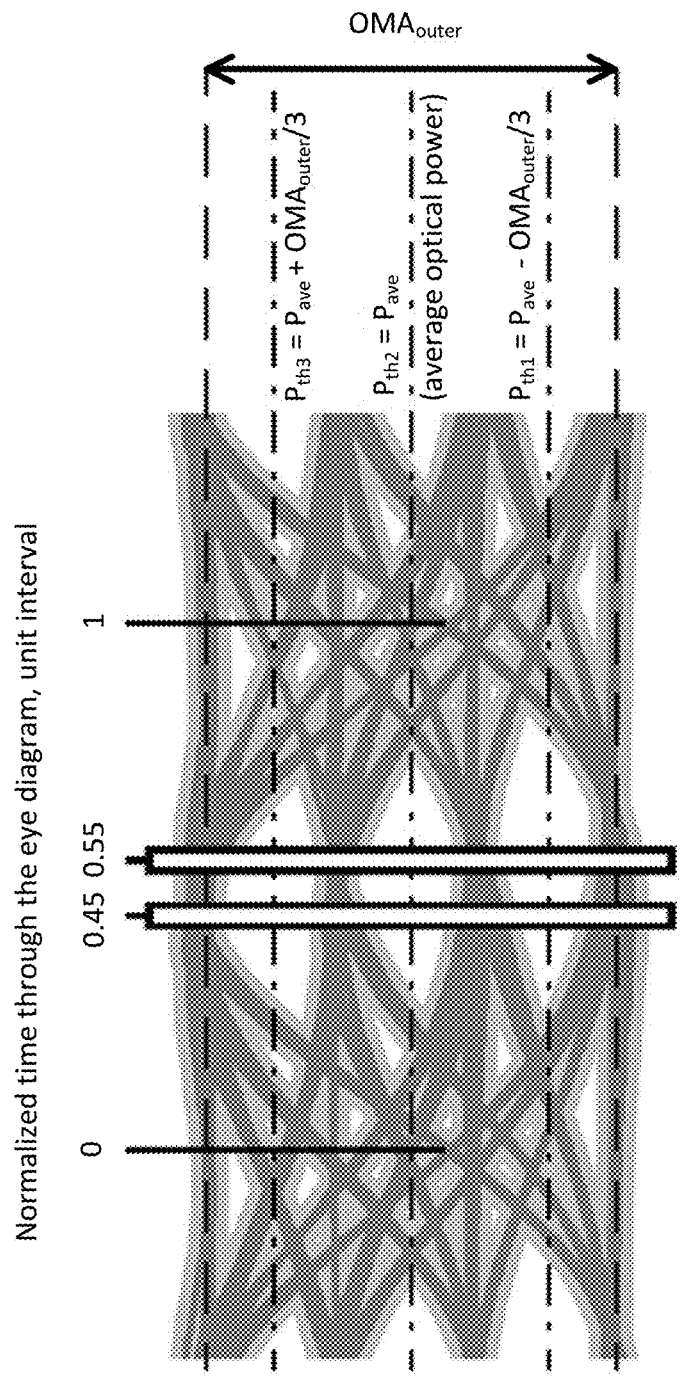
FIG. 2 shows an illustration of a transmitter and dispersion eye closure quaternary (TDECQ) measurement.

As discussed above, the complex measurement example employing an equalizer comprises the TDECQ measurement using an FFE with five taps. FIG. 2 shows an illustration of a TDECQ measurement. This diagram results from a 5-tap feed forward equalizer (FFE) with one unit interval (1UI) tap spacing optimized to minimize the TDECQ value.

TDECQ value is computed with the following formula:

$$TDECQ = 10\log_{10}\left(\frac{OMA_{outer}}{6 \times Q_r \times \sqrt{\sigma_G^2 + \sigma_S^2}}\right)$$

Where $OMA_{outer}$ is related to the power of the optical signal. $Q_r$ is a constant value. $\sigma_G^2$ is the standard deviation of a weighted Gaussian noise that can be added to the eye diagram shown in FIG. 2 and still get the larger of symbol error ratio at the two vertical slicers with 0.1UI apart is 4.8e-4. The value of $\sigma_S$ is the scope or instrument noise recorded when no signal is fed into the O/E module.

Figure 3:
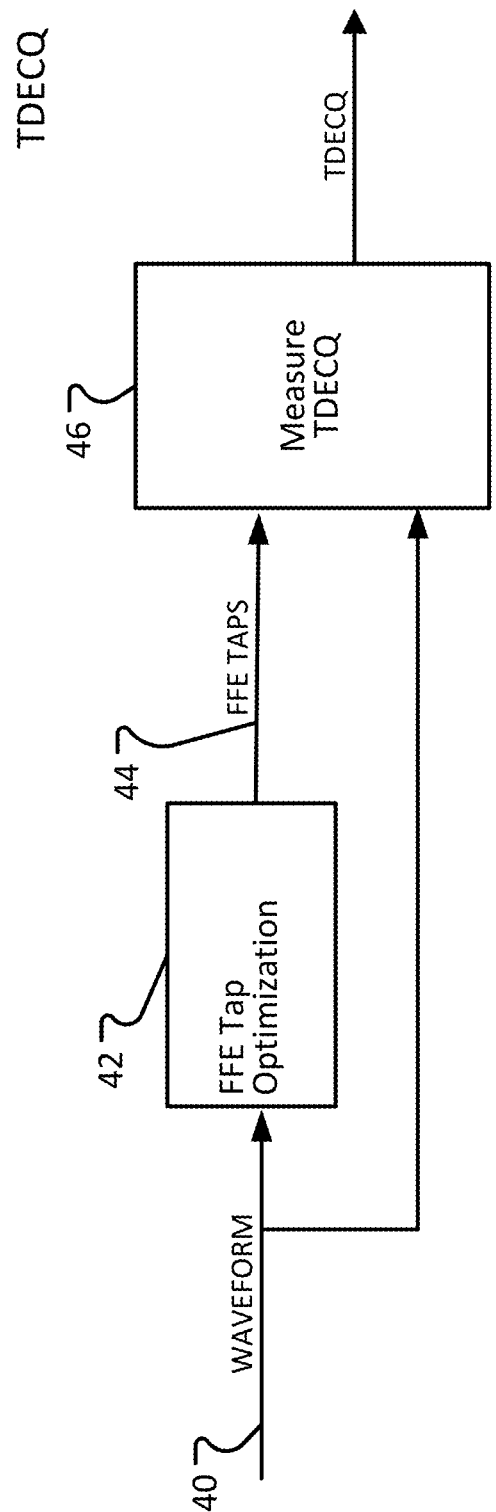
FIG. 3 shows an example of a process for optimizing FFE taps for a performance measurement.

A single TDECQ measurement on the compliance pattern SSPRQ (short stress pattern random quaternary) takes seconds to complete using conventional methods. The most time-consuming step in the measurement is the FFE tap adaption. The IEEE specification explicitly defines the process to calculate the TDECQ value with the FFE taps. FIG. 3 shows a block diagram of this process.

Figure 4:
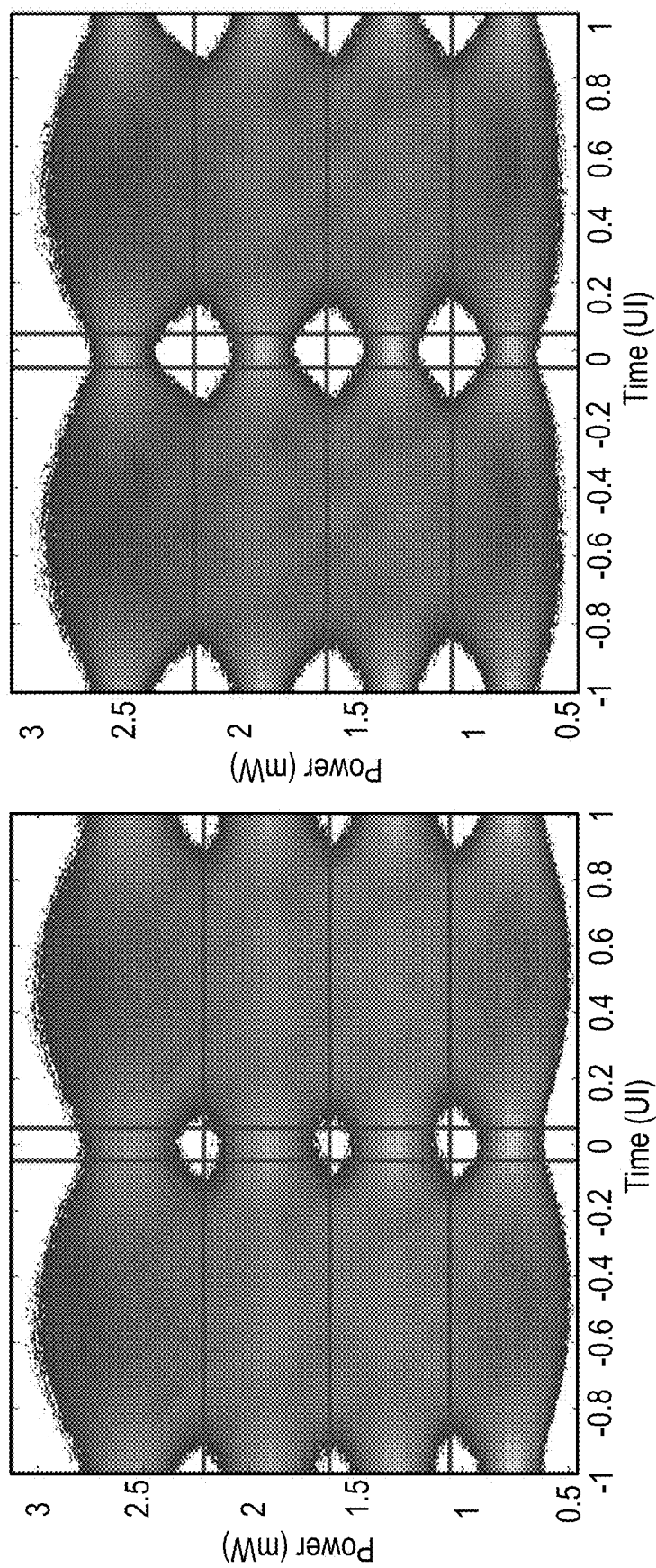
FIG. 4 shows examples of eye diagrams before and after FFE.
Figure 5:
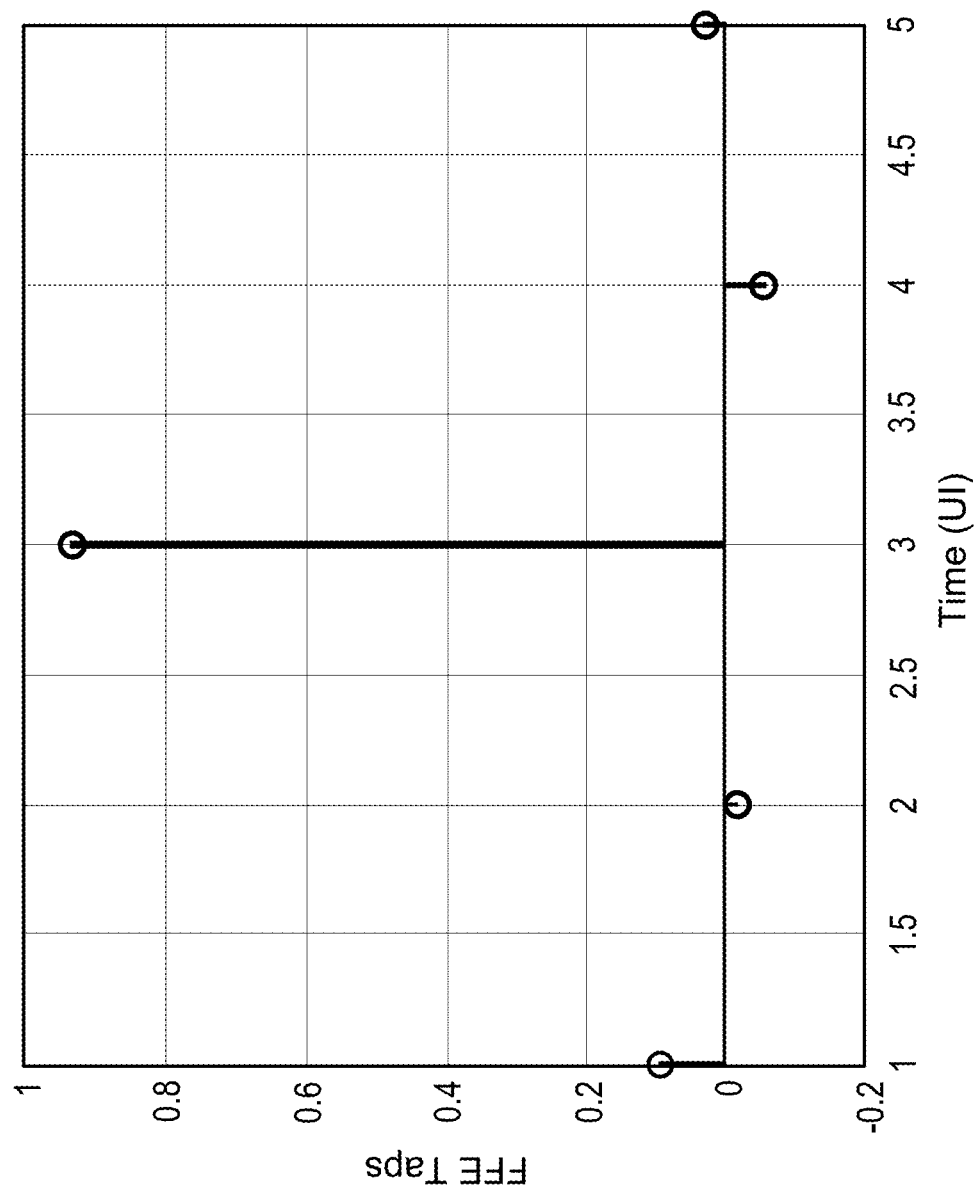
FIG. 5 shows a graphical representation of output FFE taps.

The test and measurement instrument having one or more processors receives the waveform 40 and optimizes the FFE tap values at 42 to produce optimized FFE taps 44. This process may employ one of many different methods of determining the optimized taps. The resulting taps improve the eye diagram as shown in FIG. 4. FIG. 4 shows the eye diagram before the FFE on the left and after the FFE on the right. The eye diagram after FFE has a larger eye opening. FIG. 5 shows a graphical representation of the FFE taps.

Returning to FIG. 3, the measurement process 46 applies the optimized taps to the waveform and performs the measurement at 46 in one of many conventional ways. As mentioned above, the measurement could be any measurement based upon a performance requirement, such as a range or specific value for the measurement like the TDECQ value. The measurement value will determine if the DUT meets the performance requirement or fails.

The overall TDECQ measurement on the compliance pattern SSPRQ (short stress pattern random quaternary) can take seconds to complete for each DUT. In the case of a manufacturing line testing tens of thousands of optical transceivers as DUTs, reducing this time has a massive effect on production speeds. As discussed above, the optimization of the taps for a particular waveform takes up the most time of the overall measurement. Therefore, reducing the optimization time will speed up production and lower costs.

Figure 6:
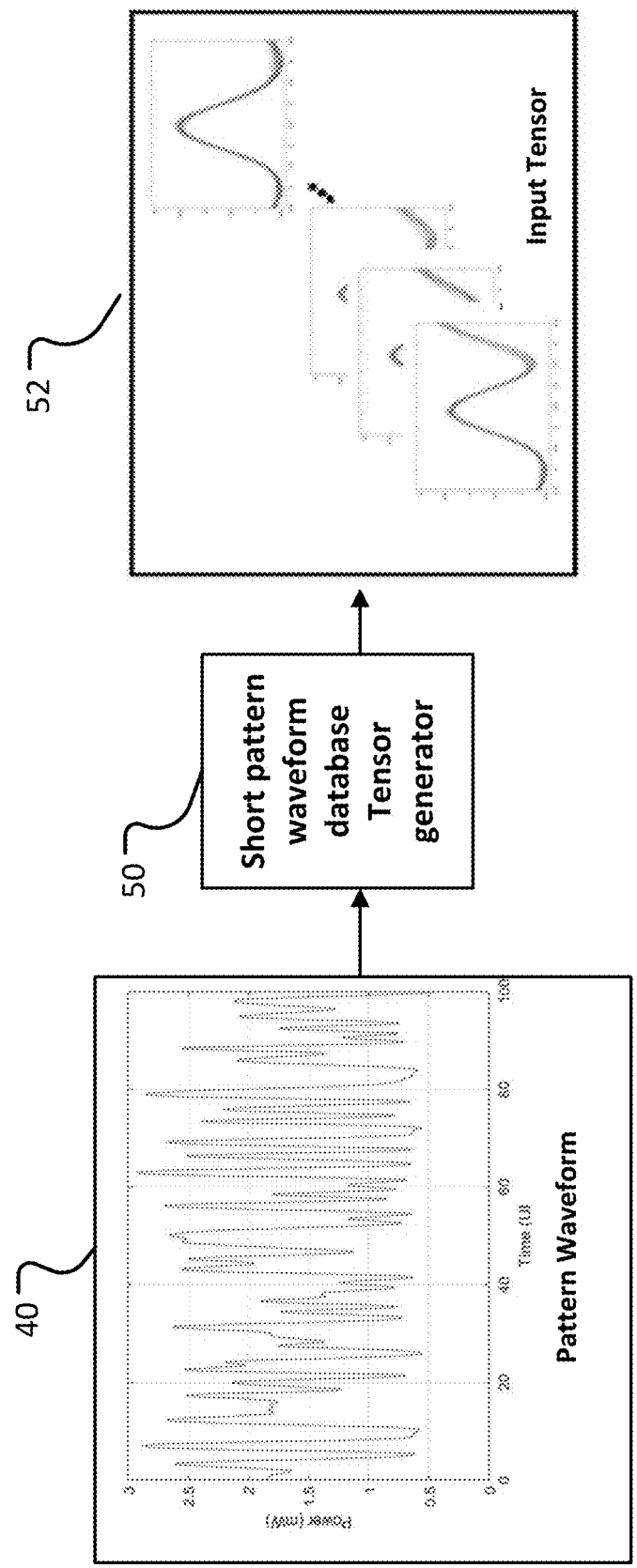
FIG. 6 shows an embodiment of a method of generating tensors from a waveform.

The embodiments here use the machine learning network to determine the FFE taps for the waveform and reduce the time to less than a second per DUT. One aspect of this approach uses the short pattern waveform database tensor generator discussed in "Kan" referenced above. FIG. 6 shows an embodiment of that process. The waveform 40 received from the DUT is converted into an array of tensor images, also referred to as a tensor array, by the generator 50. It creates an array of 2D histogram images that cover short lengths or portions of the waveform pattern. Each element of the array of tensors is a different image containing an overlay of multiple instances of a particular short pattern in the waveform 40. The pattern is different for each tensor in the array. For example, one element of the tensor array may be an overlaid image of all instances in the waveform 40 of the short 3-symbol-length pattern of symbols 0, 1, 0, another element of the tensor array may be an overlaid image of all instances in the waveform 40 of the short 3-symbol-length pattern of symbols 0, 2, 0, and so on. FIG. 6 also shows an example of a resulting tensor array 52.

Figure 7:
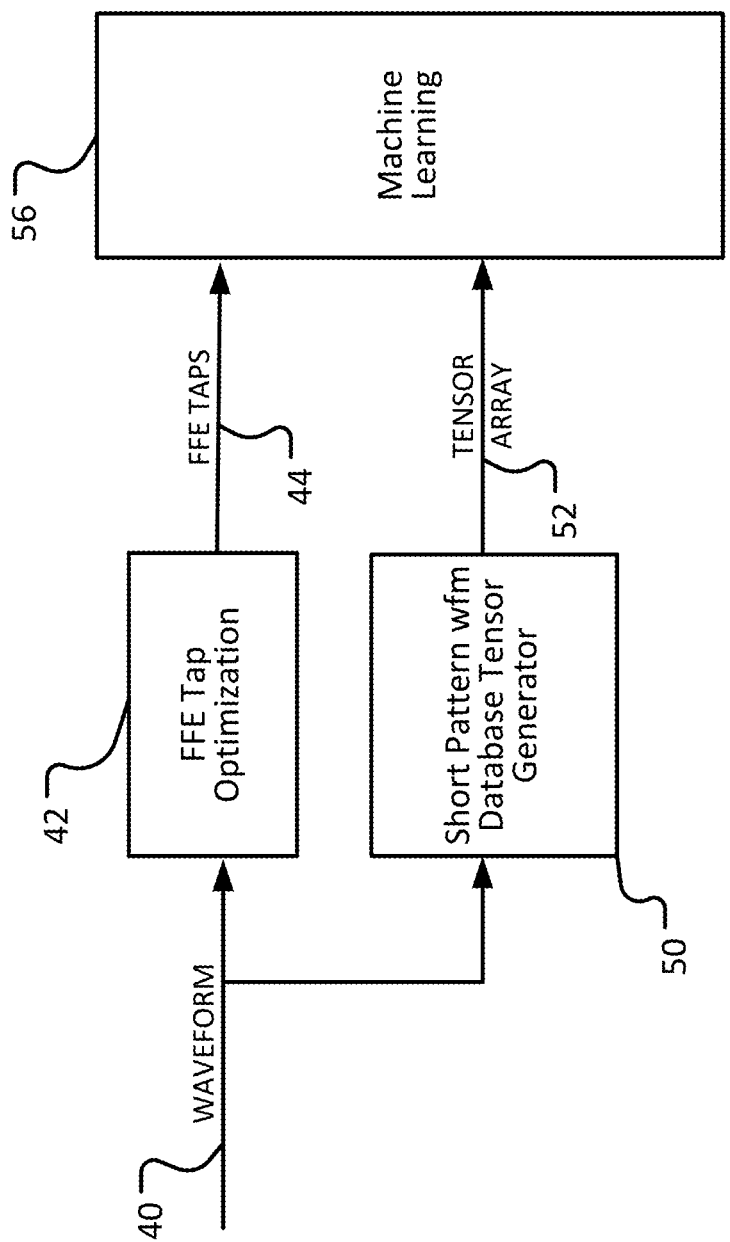
FIG. 7 shows an embodiment of a method of training a machine learning network to perform FFE tap optimization.

The process obtains optimized FFE taps for each pattern waveform as shown in FIG. 7. The optimized FFE taps are associated with the input tensors as they come from the same pattern waveforms. The input tensors and the corresponding FFE taps as labels become training data to be fed to the machine leaning network 56. The incoming waveform 40 undergoes FFE tap optimization at 42 using any existing method to produce training FFE taps 44 for that waveform. The short pattern waveform database tensor generator 50 produces a training tensor array 52. These are then sent to the machine learning network 56 to train the network to produce optimized filter tap values based upon a tensor array input.

Figure 8:
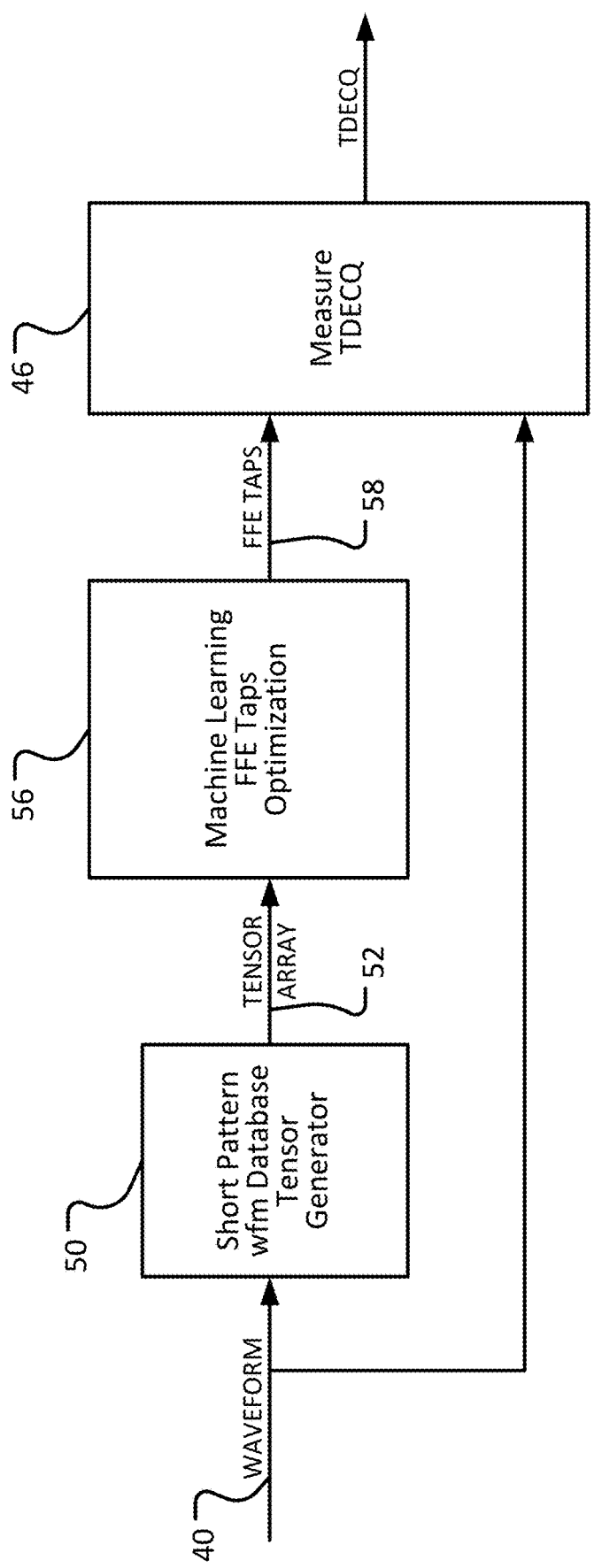
FIG. 8 shows an embodiment of a method of using machine learning to provide optimized FFE taps for a complex measurement.

Once the machine learning network has undergone training, it can produce optimized filter tap values much more quickly than conventional methods. FIG. 8 shows an embodiment of a runtime process. The waveform 40 undergoes tensor array generation at the generator 50. The trained machine learning network 56 receives the tensor array 52 and uses it to produce the predicted optimized taps at 58. These taps differ from the previous FFE taps used during training, as discussed above, because they result from the machine learning system, not from conventional methods. The FFE taps are then applied to the waveform and the TDECQ measurement is made by the measurement module 46.

Using machine learning to speed up FFE, DFE and other equalizer adaptions have been explored recently. The embodiments here use different inputs and the output from the machine learning is then used to get the measurement results. The example, as shown in FIG. 8 involves TDECQ measurement, but the same approach can be applied to other measurements, as discussed above.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Also, when reference is made in this application to a method having two or more defined steps or operations, the defined steps or operations can be carried out in any order or simultaneously, unless the context excludes those possibilities.

EXAMPLES

Illustrative examples of the disclosed technologies are provided below. An embodiment of the technologies may include one or more, and any combination of, the examples described below.

Example 1 is a test and measurement instrument, comprising: an input configured to receive a signal from a device under test; a memory; a user interface to allow the user to input settings for the test and measurement instrument; and one or more processors, the one or more processors configured to execute code that causes the one or more processors to: acquire a waveform representing the signal received from the device under test; generate one or more tensor arrays based on the waveform; apply machine learning to the one or more tensor arrays to produce equalizer tap values; and apply equalization to the waveform using the equalizer tap values to produce an equalized waveform; and perform a measurement on the equalized waveform to produce a value related to a performance requirement for the device under test.

Example 2 is the test and measurement instrument of Example 1, wherein the one or more processors are further configured to execute code to determine whether the value indicates that the device under test meets the performance requirement.

Example 3 is the test and measurement instrument of either of Examples 1 or 2, wherein the code that causes the one more processors to apply machine learning comprises code to cause the one or more processors to send the tensor arrays to a machine learning network on a device separate from the test and measurement instrument.

Example 4 is the test and measurement instrument of any of Examples 1 through 3, wherein the code to cause the one or more processors to apply machine learning to the one or more tensor arrays to produce equalizer tap values comprises code to cause the one or more processors to produce feed-forward equalizer tap values for a feed-forward equalizer (FFE).

Example 5 is the test and measurement instrument of any of Examples 1 through 4, wherein the code to cause the one or more processors to perform a measurement on the equalized waveform comprises code to cause the one or more processors to perform a transmitter and dispersion eye closure quaternary (TDECQ) measurement on the equalized waveform to produce the value.

Example 6 is the test and measurement instrument of any of Examples 1 through 5, wherein the one or more processors are further configured to execute code to cause the one or more processors to train a machine learning network, the code to cause the one or more processors to: receive a training waveform; use the training waveform to produce training equalizer tap values; generate one or more training tensor arrays from the training waveform; and provide the one or more training tensor arrays and the training equalizer tap values to the machine learning network as a training data set.

Example 7 is the test and measurement instrument of Example 6, wherein the code to cause the one or more processors to produce training equalizer tap values comprises code to produce training equalizer tap values for a feed-forward equalizer.

Example 8 is the test and measurement instrument of any of Examples 1 through 7, further comprising a probe, wherein the device under test is coupled to the input by the probe.

Example 9 is the test and measurement instrument of Example 8, wherein the probe comprises an optical fiber.

Example 10 is the test and measurement instrument of any of Examples 1 through 9, wherein the probe comprises an optical to electrical converter.

Example 11 is the test and measurement instrument of Examples 8 through 10, wherein the probe is configured to connect to a device operating under IEEE standard 802.3.

Example 12 is a method of testing a device under test, comprising: acquiring a waveform representing a signal received from the device under test; generating one or more tensor arrays based on the waveform; applying machine learning to the one or more tensor arrays to produce equalizer tap values; applying the equalizer tap values to the waveform to produce an equalized waveform; and performing a measurement on the equalized waveform to produce a value related to a performance requirement for the device under test.

Example 13 is the method of Example 12, further comprising determining whether the value indicates that the device under test meets the performance requirement.

Example 14 is the method of either Examples 12 and 13, wherein applying machine learning to the one or more tensor array to produce equalizer tap values comprises applying machine learning to the one or more tensor arrays to produce feed-forward equalizer tap values.

Example 15 is the method of Example 14, wherein the feed-forward equalizer tap values are for a 5-tap feed forward equalizer.

Example 16 is the method of any of Examples 12 through 15, wherein performing a measurement on the equalized waveform comprises measuring the transmitter and dispersion eye closure quaternary (TDECQ) of the equalized waveform.

Example 17 is the method of any of Examples 12 through 16, further comprising training a machine learning network, the training comprising: receiving a training waveform; using the training waveform to produce training equalizer tap values; and generating one or more training tensor arrays from the training waveform; and providing the one or more training tensor arrays and the training equalizer tap values to the machine learning network as a training data set.

Example 18 is the method of Example 17, wherein using the training waveform to produce training equalizer tap values comprises using the training waveform to produce training equalizer tap values for a feed-forward equalizer.

Example 19 is the method of any of Examples 12 through 18, wherein acquiring the waveform representing the signal received from the device under test comprises receiving an optical signal through a test fiber, the optical signal created by operation of the device under test.

Example 20 is the method of Example of 19, further comprising converting the optical signal to an electrical signal.

Although specific aspects of the disclosure have been illustrated and described for purposes of illustration, it will be understood that various modifications may be made without departing from the spirit and scope of the disclosure. Accordingly, the disclosure should not be limited except as by the appended claims.

We claim:

1. A test and measurement instrument, comprising:
    an input configured to receive a signal from a device under test;
    a memory;
    a user interface to allow a user to input settings for the test and measurement instrument; and
    one or more processors, the one or more processors configured to execute code that causes the one or more processors to:
        acquire a waveform representing the signal received from the device under test;
        generate one or more tensor arrays based on the waveform;
        apply machine learning to the one or more tensor arrays to produce equalizer tap values; and
        apply equalization to the waveform using the equalizer tap values to produce an equalized waveform; and
        perform a measurement on the equalized waveform to produce a value related to a performance requirement for the device under test.

2. The test and measurement instrument as claimed in claim 1, wherein the one or more processors are further configured to execute code to determine whether the value indicates that the device under test meets the performance requirement.

3. The test and measurement instrument as claimed in claim 1, wherein the code that causes the one more processors to apply machine learning comprises code to cause the one or more processors to send the tensor arrays to a machine learning network on a device separate from the test and measurement instrument.

4. The test and measurement instrument as claimed in claim 1, wherein the code to cause the one or more processors to apply machine learning to the one or more tensor arrays to produce equalizer tap values comprises code to cause the one or more processors to produce feed-forward equalizer tap values for a feed-forward equalizer (FFE).

5. The test and measurement instrument as claimed in claim 1, wherein the code to cause the one or more processors to perform a measurement on the equalized waveform comprises code to cause the one or more processors to perform a transmitter and dispersion eye closure quaternary (TDECQ) measurement on the equalized waveform to produce the value.

6. The test and measurement instrument as claimed in claim 1, wherein the one or more processors are further configured to execute code to cause the one or more processors to train a machine learning network, the code to cause the one or more processors to:
    receive a training waveform;
    use the training waveform to produce training equalizer tap values;
    generate one or more training tensor arrays from the training waveform; and
    provide the one or more training tensor arrays and the training equalizer tap values to the machine learning network as a training data set.

7. The test and measurement instrument as claimed in claim 6, wherein the code to cause the one or more processors to produce the training equalizer tap values comprises code to produce the training equalizer tap values for a feed-forward equalizer.

8. The test and measurement instrument as claimed in claim 1, further comprising a probe, wherein the device under test is coupled to the input by the probe.

9. The test and measurement instrument as claimed in claim 8, wherein the probe comprises an optical fiber.

10. The test and measurement instrument as claimed in claim 8, wherein the probe comprises an optical to electrical converter.

11. The test and measurement instrument as claimed in claim 8, wherein the probe is configured to connect to the device under test operating under IEEE standard 802.3.

12. A method of testing a device under test, comprising:
    acquiring a waveform representing a signal received from the device under test;
    generating one or more tensor arrays based on the waveform;
    applying machine learning to the one or more tensor arrays to produce equalizer tap values;
    applying the equalizer tap values to the waveform to produce an equalized waveform; and performing a measurement on the equalized waveform to produce a value related to a performance requirement for the device under test.

13. The method as claimed in claim 12, further comprising determining whether the value indicates that the device under test meets the performance requirement.

14. The method as claimed in claim 12, wherein applying machine learning to the one or more tensor arrays to produce equalizer tap values comprises applying machine learning to the one or more tensor arrays to produce feed-forward equalizer tap values.

15. The method as claimed in claim 14, wherein the feed-forward equalizer tap values are for a 5-tap feed forward equalizer.

16. The method as claimed in claim 12, wherein performing a measurement on the equalized waveform comprises measuring a transmitter and dispersion eye closure quaternary (TDECQ) of the equalized waveform.

17. The method as claimed in claim 12, further comprising training a machine learning network, the training comprising:

receiving a training waveform;

using the training waveform to produce training equalizer tap values; and generating one or more training tensor arrays from the training waveform; and providing the one or more training tensor arrays and the training equalizer tap values to the machine learning network as a training data set.

18. The method as claimed in claim 17, wherein using the training waveform to produce the training equalizer tap values comprises using the training waveform to produce the training equalizer tap values for a feed-forward equalizer.

19. The method as claimed in claim 12, wherein acquiring the waveform representing the signal received from the device under test comprises receiving an optical signal through a test fiber, the optical signal created by operation of the device under test.

20. The method as claimed in claim 19, further comprising converting the optical signal to an electrical signal.

* * * * *